Jan. 1, 1924

J. SLEPIAN

COMMUTATOR MOTOR

Filed Aug. 8, 1919

1,479,158

3 Sheets-Sheet 1

WITNESSES:

INVENTOR
Joseph Slepian,
BY
ATTORNEY

Jan. 1, 1924 1,479,158
J. SLEPIAN
COMMUTATOR MOTOR
Filed Aug. 8, 1919 3 Sheets-Sheet 2
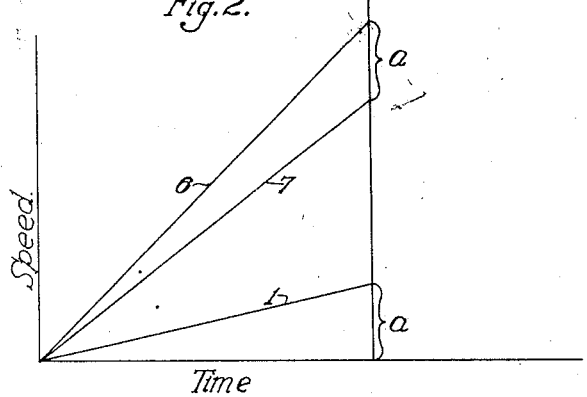
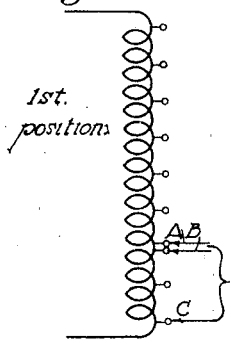
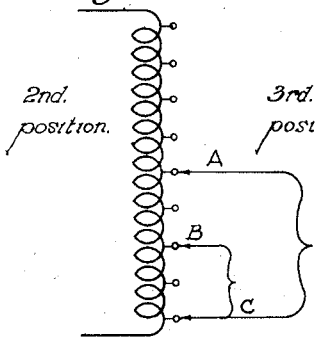
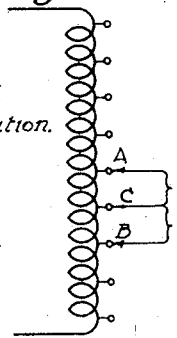
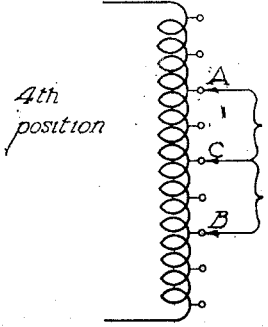
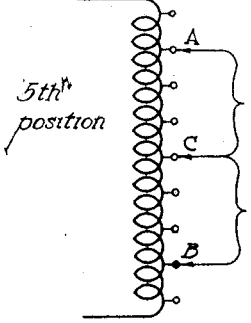
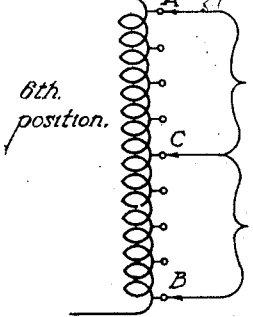
WITNESSES:
INVENTOR
Joseph Slepian
BY
ATTORNEY Jan. 1, 1924

J. SLEPIAN 1,479,158

COMMUTATOR MOTOR

Filed Aug. 8, 1919   3 Sheets-Sheet 3

| Position | Machine A.C. | Machine B.C. | Torque Machine |
|---|---|---|---|
| 0 | 0 | 0 | 0 |
| 1 | 25 | 25 | 0 |
| 2 | 50 | 25 | 25 |
| 3 | 12½ | −12½ | 25 |
| 4 | 25 | −25 | 50 |
| 5 | 37½ | −37½ | 75 |
| 6 | 50 | −50 | 100 |

WITNESSES:
Geo D Barrett
a.a.Brand

INVENTOR
Joseph Slepian
BY
Wesley G Carr
ATTORNEY

Patented Jan. 1, 1924.

1,479,158

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

COMMUTATOR MOTOR.

Application filed August 8, 1919. Serial No. 316,171.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Commutator Motors, of which the following is a specification.

My invention relates to commutator motors, particularly to machines of the character designated which are to be accelerated slowly, and it has for its object to provide means whereby good commutation may be obtained throughout the entire acceleration range of the machine.

Figure 1:
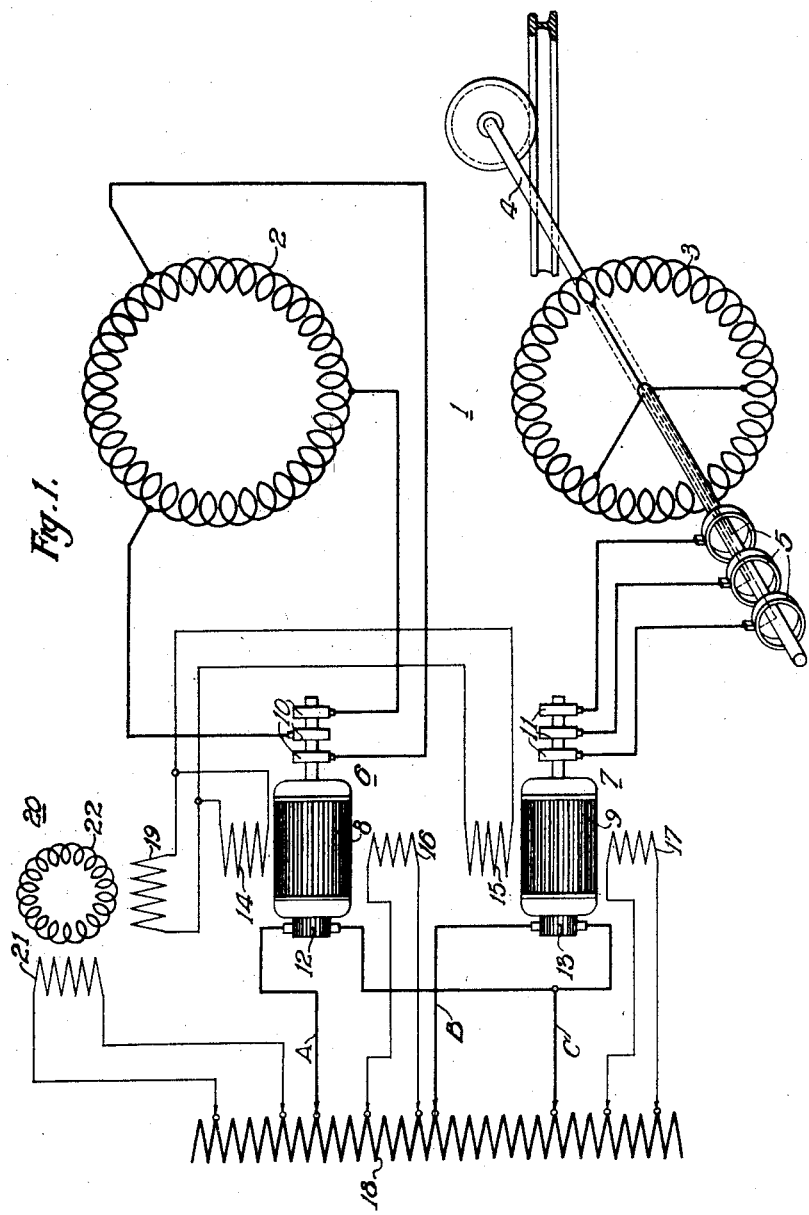
Figures 9, 10:
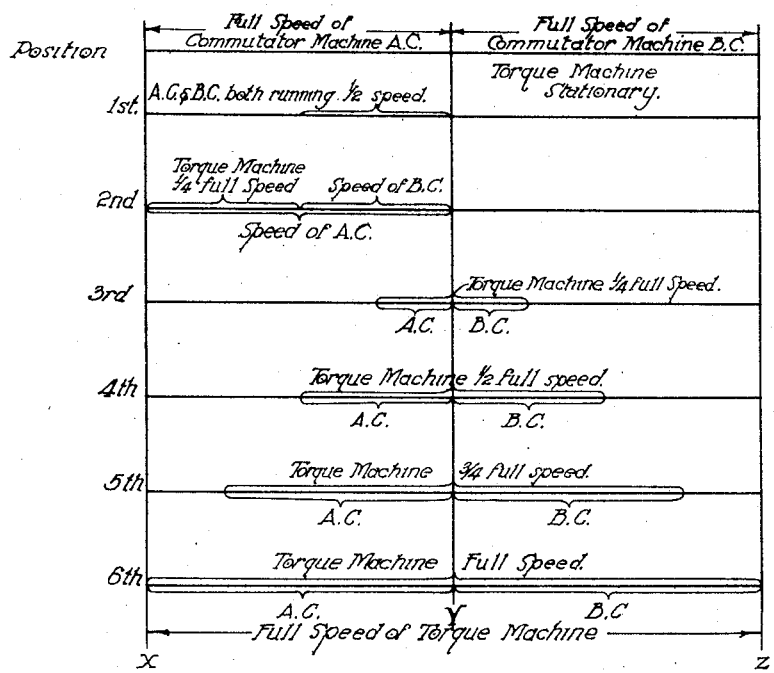

For a better understanding of my invention, reference may be had to the accompanying drawing in which Figure 1 is a diagrammatic view of the machines and the connections used in my commutator-motor construction; Fig. 2 is a graph representing the manner in which the various elements of the machine aggregate are accelerated; Figs. 3 to 8 inclusive are fragmentary diagrammatic views showing the source of energy supply and accompanying control taps; and Figs. 9 and 10 are diagrammatic and literal tables, respectively, of the manner in which the various machine elements are accelerated.

In alternating-current commutator machines, good commutation is generally secured by providing an interpole field winding and so exciting the same that the interpole flux shall be varied inversely as the machine speed. Obviously, therefore, it is impossible, at exceptionally low speeds, to set up a sufficient flux to ensure the generation of an adequate compensating voltage. For motors which are inherently started with low acceleration, such as railway motors, the commutation at starting is a serious consideration and greatly affects the design of the machine.

One object of my invention is, therefore, to so arrange an electrical machine aggregate that the portion thereof which furnishes the torque to the axle may be accelerated very slowly over its entire speed range, while that portion of the machine aggregate through which the alternating-current power is fed by means of a commutator and an associated rotating element, may be very rapidly accelerated, thus carrying the latter element swiftly over the points of possible bad commutation.

In my copending application, Serial No. 317,689, filed August 15, 1919, I have described, in considerable detail, the advantages which ensue from a separation of the commutation and torque-developing functions in an electrical machine and will not, therefore, describe this feature more fully in connection with the present application other than to point out that, by the use of the system which I hereinafter describe, all of the machine elements which perform any portion of the commutating function are so segregated that they may be placed in any desired location. In railway practice, for instance, the commutating elements would be placed in the clean-dry location afforded by the engine cab.

Another object of my invention, and the one to which this application is mainly directed, is to provide a machine aggregate, the propulsion element of which comprises primary and secondary elements, in which both these windings are supplied conductively with currents of varying frequencies through commutating machines. Such an arrangement admits of very close speed regulation as well as gives the advantageous conductive supply of energy to both of the propulsion-machine members. As will hereinafter be apparent, I provide control means whereby the speeds of the commutator elements of my invention aggregate may be so adjusted that the propulsion motor is accelerated very slowly over its entire speed range, while the commutation machines are brought up very rapidly to a speed which is in excess of that at which commutation difficulties are pronounced.

Referring now more particularly to Fig. 1, a machine 1, somewhat analogous to an induction motor in structure, is shown as comprising windings 2 and 3, the winding 3 being rigidly attached to an axle 4 of a locomotive truck. The winding 3 is provided with slip rings 5—5 to admit of conductive energy supply during the rotation thereof. Two small commutator machines 6 and 7 are provided with armature windings 8 and 9, slip rings 10 and 11, commutators 12 and 13, main field windings 14 and 15, and interpole field windings 16 and 17, respectively.

Any desirable source of energy, here represented as a transformer secondary 18, is provided and is connected to the commutator ends of the machines 6 and 7 through adjustable leads A, B and C. The main field windings 14 and 15 of the machines 6 and 7 are connected in parallel relationship to a tertiary winding 19 which is embodied in a machine 20 and which is energized in electrical quadrature to the voltage of the source 18 through a primary winding 21 and a secondary rotatable winding 22 of the machine 20. The interpole field windings 16 and 17 are supplied directly from the source 18. It will be noted that the lead C is common to both of the machines 6 and 7.

As will be more fully pointed out in the following description of the operation of my commutator-motor system, the power is fed into the commutator machines 6 and 7, out through the slip rings 10 and 11, and into the windings 2 and 3, respectively. For purposes of convenience, I will hereinafter designate the torque or propulsion machine 1 as an induction motor, although in its functions or operation, it is of a widely different type from that represented by the machine which is usually so designated, as will be understood from the following description.

The induction motor will run at a speed equal to the algebraic difference of the speeds of the commutator machines. The latter machines run without delivering mechanical power and absorb only sufficient energy to overcome their respective friction and windage losses. In my aforementioned copending application, Serial No. 317,689, as well as in my copending application, Serial No. 291,157, filed April 18, 1919, I have pointed out, in detail, the manner in which the commutator machines supply unbalanced polyphase currents of such nature that the fields produced in the polyphase windings of the torque-producing motor are similar to the fields in the commutator machines, the motor fields rotating at speeds corresponding to the speeds of the commutator machines. The unbalanced polyphase currents derived from the respective commutator machines are of such nature as to substantially neutralize the single-phase supply current in the armature windings, thus permitting the two commutator machines to be small, as hereinbefore mentioned. Therefore, in the following, I will discuss only the possibilities of speed control which are obtained by reason of the particular construction herein described.

The induction motor may be run at a very low speed, while the two commutator machines are operated at relatively high speeds and with but a small speed difference therebetween. To increase the speed of the torque or induction motor, the difference between the speeds of the commutator machines is increased by predetermined manipulation of the leads A, B and C, thus varying the voltages at the brushes of the machines in question. Moreover, the speed of the propulsion motor may be maintained constant while the commutator-machine speeds are raised and lowered together, the difference between the speeds of the latter being kept constant. Thus the absolute value of the acceleration of the commutator machines is arbitrary and may be any value that the commutation considerations of such machines dictate, and only when their accelerations differ is there acceleration of the torque or propulsion motor.

The advantage of such a system of acceleration may be understood by reference to Fig. 2. In this graph, the ordinates represent absolute speeds, while the abscissae indicate time. Assume that a speed indicated by the ordinate "$a$" should be attained in the propulsion machine 1 in the time indicated, that is to say, it is necessary that the machine 1 be accelerated very slowly. It is obvious that the commutation difficulties which attend such a low rate of acceleration are quite serious, and, therefore, it would be a matter of very considerable difficulty to obtain smooth acceleration of the machine 1, assuming direct energization. However, if, as above pointed out, all of the power is fed into the two rapidly rotating and quickly accelerated commutator machines, and the speed of the propulsion motor is determined by the difference in the speeds of the commutator machines, a situation, as shown by the curves 6 and 7 exists in the machine aggregate, that is, as will be noted from a consideration of the speed-time curve of Fig. 2, the machines 6 and 7 are accelerated very rapidly, more so than would be possible with a direct energized machine only. However, the difference of the speeds of the machines 6 and 7 is still equal to "$a$" or that speed which it is desired and necessary that the propulsion motor shall reach in a predetermined time. It is apparent, therefore, that, by so arranging the various machines in a commutator-motor system, the commutator machines themselves may be accelerated quite rapidly and yet have only an ultimate effect upon the acceleration of that vehicle to which they are attached, as would be obtained if a single propulsion motor were used and accelerated so slowly that commutation difficulties would be inevitable.

I will now describe one system of accelerating the propulsion motor, and, in this connection, attention is directed to Figs. 3 to 10 inclusive. However, I do not wish it understood that the acceleration steps which I shall hereinafter describe, are to be in any way interpreted as limiting my system, or method of operating the same, thereto. Furthermore, in Figs. 3 to 8 inclusive, I have shown a source of energy—a transformer secondary—as provided with a certain number of tapped points. In actual practice, however, especially if it is desired to use my system in connection with industrial applications where a speed in excess of arbitrary full speed is desired, I find that the transformer winding may be extended to any desired length and the voltages drawn therefrom in such manner that the proper algebraic addition or subtraction of the commutator-machine speeds results in a greater speed range of the propulsion motor than I will hereinafter describe.

In the acceleration sequence of the following operation, I assume that the interpole compensation effect is such that good commutation may be secured with the commutator machines 6 and 7 at quarter speed or above. The first step is to bring both commutator machines very rapidly to one-half speed, by placing the leads A, B and C in the position shown in Fig. 3. This setting of the leads A, B and C I have designated, in Figs. 9 and 10, as the first position, it being noted that the zero position is that one in which none of the machine elements are energized or moving. Furthermore, in the accompanying tables and acceleration charts, I have designated the machine 6 as "machine AC"; and the machine 7 as "machine BC"; having adopted this method of designation in order to more clearly connect the function of the two machines with their respective lead connections to the source of energy 18.

Referring for a moment to Fig. 9, it will be observed that the horizontal lines represent the various positions of the leads. The vertical line bisecting the horizontal lines represents zero speed of the commutator machines, and, therefore, when both of the commutator machines are running in the same direction, their speeds may be represented as extending to the left of the middle line, and, when running in opposite directions, their speeds will, of course, extend on opposite sides of the aforesaid dividing line. That is to say, full speed of the commutator machine AC in one direction is represented by the distance XY, while full speed of the commutator machine BC in the other direction is represented by the distance YZ. Since, as I have hereinbefore pointed out, the speed of the torque machine is equal to the algebraic difference of the speeds of the commutator machines, full speed of the torque machine will be represented by the distance XZ.

Fig. 10 should be considered together with Fig. 9, the former figure being devoted to a numerical representation of the manner in which the speeds of the different machine elements vary as the successive acceleration steps are performed. In the aforesaid figure, it will be noted that I have designated the speed of one of the machines as negative, this change being made to indicate that the commutator machines are rotating in opposite directions after a certain acceleration step has been made.

I have pointed out that the first step in starting a propulsion motor, energized as hereinbefore described, is to bring both of the commutator machines up to a certain predetermined speed. There being no difference between the speeds, the torque motor will be at standstill. This condition is represented in Figs. 9 and 10 at position 1. For purposes of convenience, I have illustrated this point as being at one-half speed of the commutator machines, and have selected, as a unit to which the speeds of all of the machines may be referred, the full speed of the torque motor as 100, while the full speed of each of the commutator machines is 50. With both of the commutator machines rotating in the same direction at one-half speed, the algebraic difference of the speeds thereof will be equal to zero and the torque machine will be at standstill.

It will be observed that, because the commutator machines need overcome only friction and windage resistance, the aforesaid speed may be attained with the maximum acceleration, and the low running speeds will therefore be very quickly passed. Any commutator difficulties which would be apparent if the commutator machines were accelerated slowly are in this way greatly diminished or entirely overcome.

Referring now to Fig. 4, I next raise machine AC to full speed, by moving the lead A upwardly, the machine BC being maintained at one-half speed. Therefore, the difference between the speeds of the two machines results in an acceleration of the propulsion motor 1 and, as was pointed out in connection with Fig. 2, a very slow rate of acceleration is possible with the machine 1, while a high speed is maintained in connection with the two commutator machines.

Referring again to Figs. 9 and 10 and noting the conditions prevailing at position 2, it will be observed that the algebraic difference of the speeds of the two machines is equal to an absolute value of 25, as indicated in Fig. 10, and, as shown diagrammatically in Fig. 9, to one-quarter of full speed of the torque machine.

It is now necessary to reverse the direction of the operation of one of the commutator machines, in order that their speed range may be more effectively employed to control the ultimate speed of the torque motor. The lead C, which is common to both of the machines, is, therefore, moved upwardly and is so located between the leads A and B that the machines are rotating in opposite directions, each at one-quarter speed. As before pointed out, quarter speed on the commutator machines is substantially the lowest speed at which the commutation difficulties are not pronounced, and, therefore, I have used no speed lower than one-quarter speed as a running speed of these machines. Referring to Figs. 9 and 10, it will be seen that the third position indicates that the torque machine is still running at one-quarter of full speed. Therefore, no change has been made in the speed of that machine, even though a considerable difference has been effected in both the speed and the direction of rotation of the commutator machines. Herein resides one of the particular advantages of a system constructed in accordance with my invention, namely, that the machines which are susceptible of commutating difficulties may be manipulated quite freely without, in any way, affecting the speed conditions of the propulsion motor which is the main accelerated unit in the combination.

From this point on, as will be noted in connection with Figs. 6 to 8 inclusive, the acceleration steps are relatively simple, consisting only in moving the leads A and B in opposite directions away from the lead C. The smoothness with which the torque machine may be accelerated will be appreciated from a consideration of Fig. 9 wherein it will be seen that the speed of the torque machine is increased in a desirable manner through the positions 4, 5 and 6, and that, when each of the commutator machines is running at full speed, but in opposite directions, the torque machine will likewise be operating at full speed.

The smoothness of the acceleration of the torque motor is limited only by the number of taps with which the source of supply is provided and, obviously, therefore, I do not wish to be limited to the particular sequence which I have just described.

While I have described but one embodiment of my invention, together with a method of practicing the same, it is obvious that many modifications therein may occur to those skilled in the art, and I desire, therefore, that only such limitations shall be placed thereupon as are imposed by the prior art or are specifically set forth in the appended claims.

I claim as my invention:

1. A dynamo-electric machine comprising primary and secondary members, and means for independently supplying each of said members with a rotating alternating field of varying speed.

2. A dynamo-electric machine comprising primary and secondary members, and means for independently and simultaneously supplying each of said members with a rotating field, one of said fields being an alternating field of variable speed.

3. A dynamo-electric machine comprising primary and secondary members, and means comprising independently regulated dynamo-electric machines for conductively supplying currents of varying frequencies of each of said members, one of said last-mentioned dynamo-electric machines supplying polyphase currents of such nature as to produce a rotating alternating field.

4. A dynamo-electric machine comprising primary and secondary members, means comprising independently regulated dynamo-electric machines for conductively supplying each of said members with a rotating alternating field of varying speed, and means whereby the speed of the first-named dynamo-electric machine may be regulated over a complete speed range through said last-named dynamo-electric machines.

5. A dynamo-electric machine comprising primary and secondary members, and auxiliary dynamo-electric machines electrically associated therewith to furnish currents conductively to each of said members, the frequency of said currents being dependent upon the speeds of said auxiliary machines, at least one of said currents being polyphase currents of such nature as to produce a rotating alternating field, and means for varying the speeds of said auxiliary machines, the speed variation of said auxiliary machines determining the absolute speed of said first-named dynamo-electric machine.

6. A dynamo-electric machine comprising primary and secondary members, and auxiliary dynamo-electric machines electrically associated therewith to furnish currents conductively to each of said members, the frequency of said currents being dependent upon the speeds of said auxiliary machines, at least one of said currents being polyphase currents of such nature as to produce a rotating alternating field, and means for varying the speeds of said auxiliary machines, the algebraic difference in the speeds of said auxiliary machines determining the absolute speed of said first-named dynamo-electric machine.

7. A dynamo-electric machine comprising primary and secondary members, means electrically associated therewith whereby currents of varying frequencies are conductively supplied to both members, and means for controlling the frequency of the currents so supplied, said currents being of such nature as to produce rotating alternating fields.

8. A dynamo-electric machine comprising primary and secondary members, auxiliary commutator-type dynamo-electric machines electrically associated with each of said members, means whereby said auxiliary machines may be very rapidly accelerated to a speed in excess of that at which commutation difficulties are pronounced, and means whereby the main machine may be very slowly accelerated over its entire speed range.

9. A dynamo-electric machine comprising polyphase primary and secondary members, a pair of auxiliary single-phase dynamo-electric machines, means for deriving unsymmetrical polyphase currents of variable frequencies from said auxiliary machines, said polyphase currents being of such nature as to set up rotating alternating fields, and electrical connections for supplying said polyphase currents to said primary and secondary members, respectively.

10. The combination with a main dynamo-electric machine comprising polyphase primary and secondary members, of a pair of auxiliary dynamo-electric machines, means for deriving polyphase currents of variable frequencies from said auxiliary machines, electrical connections for supplying said polyphase currents to said primary and secondary members, respectively, whereby the speed of said main machine is proportional to the algebraic difference between the frequencies of said polyphase currents, means for changing said algebraic difference, and means for simultaneously varying said frequencies without varying their algebraic difference.

11. A dynamo-electric machine comprising primary and secondary members, auxiliary dynamo-electric machines associated with said members, connecting means betwen said dynamo-electric machines to insure that the speed of the main dynamo-electric machine shall be equal to the difference of the speeds of the auxiliary machines, and means for simultaneously changing the speeds of the auxiliary machines in the same sense without affecting the speed of the main machine.

12. A dynamo-electric machine comprising primary and secondary members, a pair of auxiliary dynamo-electric machines electrically associated with said members, respectively, means for running said auxiliary machines at a relatively high rate of speed, means for supplying power therefrom to the main machine to cause the latter to run at a speed corresponding to the speed difference between said auxiliary machines, means for varying said speed difference to vary the speed of the main machine, and means for changing the speeds of said auxiliary machines while maintaining their speed difference constant, whereby the speed of the main machine remains unchanged during said speed change of said auxiliary machines.

13. In combination with a source of variable electromotive forces, a dynamo-electric machine comprising rotor and stator members, and means connected to said source for independently interchanging electrical energy, in the form of currents of varying frequencies, between said source and each of said members, said frequencies being varied in accordance with variations in said electro-motive forces.

14. In combination with a source of electro-motive forces, a dynamo-electric machine comprising rotor and stator members, commutator machines for independently supplying currents of varying frequencies to each of said members, means for varying the voltage applied to the commutator machines from said source, and connections between the commutator machines and main dynamo-electric machine whereby the speed changes of the latter may be governed by adjustment of said voltage-varying means.

15. In combination with a source of electro-motive forces, a dynamo-electric machine comprising rotor and stator members, commutator machines for independently supplying currents of varying frequencies to each of said members, said commutator machines being provided with main field windings energized from a source in electrical quadrature to said main source and with compensating windings energized directly from said main source, means for varying the voltage applied to the commutator machines from said source, and connections betwen the commutator machines and main dynamo-electric machine whereby the speed changes of the latter may be governed by adjustment of said voltage-varying means.

16. In combination with a source of electro-motive forces, a dynamo-electric machine comprising rotor and stator members, commutator machines for independently supplying currents of varying frequencies to each of said members, means for varying the speeds of said commutator machines, and connections betwen the commutator machines and main dynamo-electric machine whereby the speed changes of the latter may be governed through the speed variations of said commutator machines.

17. In combination with a source of electro-motive forces, a dynamo-electric machine comprising rotor and stator members, auxiliary dynamo-electric machines embodying armature windings provided with a commutator and slip rings, connections from said source to said commutator, connections from said slip rings to said stator and rotor windings, and means for varying the speed of said rotor member through the voltage impressed upon said commutator machines.

18. The method of operating a dynamo-electric machine comprising primary and secondary members each supplied with power conductively from an auxiliary commutator-type dynamo-electric machine electrically associated therewith, which comprises running said auxiliary machines at speeds in excess of that at which commutation difficulties are pronounced, while the main dynamo-electric machine runs at any speed.

19. The method of operating a dynamo-electric machine comprising primary and secondary members each supplied with power conductively from an auxiliary commutator-type dynamo-electric machine electrically associated therewith, which comprises always running said auxiliary machines at speeds in excess of that at which commutation difficulties are pronounced, even though the main machine is at standstill or running at a very low speed.

20. The method of operating a dynamo-electric machine comprising primary and secondary members each supplied with power conductively from an auxiliary commutator-type dynamo-electric machine electrically associated therewith, which comprises running said auxiliary machines at predetermined speeds selected to give good commutating conditions, and running the main machine at a speed equal to the difference between said commutator-machine speeds.

21. The method of operating a dynamo-electric machine comprising primary and secondary members each supplied with power conductively from an auxiliary commutator-type dynamo-electric machine electrically associated therewith, which comprises running said auxiliary machines at predetermined speeds selected to give good commutating conditions, and running the main machine at a speed equal to the algebraic difference between said commutator-machine speeds.

22. The method of operating a dynamo-electric machine comprising primary and secondary members each suppplied with power conductively from a commutator dynamo-electric machine electrically associated therewith, which comprises supplying current through said commutator machines to said stator and rotor members and controlling the frequencies of the currents so supplied, the speeds of said commutator machines being selected for good commutation conditions.

23. The method of operating a dynamo-electric machine comprising primary and secondary members each supplied with power conductively from a commutator dynamo-electric machine electrically associated therewith, which comprises supplying current through said commutator machines to said stator and rotor members and varying the speeds of said commutator machines to vary the frequencies of the currents so supplied, the speeds of said commutator machines being selected for good commutation conditions.

24. The method of operating a dynamo-electric machine comprising primary and secondary members each supplied with power conductively from an auxiliary commutator-type dynamo-electric machine electrically associated therewith, which comprises controlling the speed changes in said main dynamo-electric machine by governing the voltages applied to said commutator machines, the speeds of said commutator machines being selected for good commutation conditions.

25. The method of operating, in conjunction with a source of electromotive forces, a dynamo-electric machine comprising primary and secondary members each conductively supplied with power from a commutator dynamo-electric machine electrically associated therewith, which comprises energizing said commutator machines from said source, supplying power through said commutator machines to the members of said main dynamo-electric machine, and controlling the speed of the latter by varying the voltages impressed upon said commutator machines, the speeds of said commutator machines being selected for good commutation conditions.

26. The method of operating, in conjunction with a source of electromotive forces, a dynamo-electric machine comprising primary and secondary members each conductively supplied with power from a commutator dynamo-electric machine electrically associated therewith, which comprises energizing said commutator machines from said source, supplying power through said commutator machines to the members of said main dynamo-electric machine, and varying the speed of the commutator machines to govern the speed changes of the main dynamo-electric machine, the speeds of said commutator machines being selected for good commutation conditions.

27. The method of operating a dynamo-electric machine comprising primary and secondary members each supplied with power conductively from a commutator dynamo-electric machine electrically associated therewith, which comprises accelerating said commutator machines very rapidly to a point in excess of that speed at which commutation difficulties are pronounced, while said main machine remains at standstill.

28. The method of operating a dynamo-electric machine comprising primary and secondary members each supplied with power conductively from a commutator dynamo-electric machine electrically associated therewith, which comprises accelerating said commutator machines very rapidly to a point in excess of that speed at which commutation difficulties are pronounced, while said main machine accelerates at a very low rate of speed.

29. The method of operating a dynamo-electric machine comprising primary and secondary members each supplied with power conductively from an auxiliary commutator-type dynamo-electric machine electrically associated therewith, which comprises reaching a high relative speed with said commutator machines in the same time that the main machine attains a very low speed.

30. The method of operating a dynamo-electric machine comprising primary and secondary members each supplied with power conductively from an auxiliary commutator-type dynamo-electric machine electrically associated therewith, which comprises accelerating said commutator machines very rapidly with a small speed difference and accelerating said main dynamo-electric machine very slowly to a speed equal to said commutator machines speed difference.

31. The method of accelerating, in conjunction with a source of electromotive forces, a dynamo-electric machine comprising primary and secondary members each conductively supplied with power from a commutator machine electrically associated therewith, which comprises initially accelerating said commutator machines very rapidly to a speed in excess of that at which commutation difficulties are pronounced, then increasing the speed difference between said commutator machines, and supplying power through said commutator machines to the members of the main machine in such manner that the latter is slowly accelerated.

32. The method of accelerating, in conjunction with a source of electromotive forces, a dynamo-electric machine comprising primary and secondary members each conductively supplied with power from a commutator machine electrically associated therewith, which comprises initially accelerating said commutator machines very rapidly to a speed in excess of that at which commutation difficulties are pronounced, then increasing the speed difference between said commutator machines while maintaining the speeds thereof in excess of said limit-of-commutation-difficulties speed, and supplying power through said commutator machines to the members of the main machine in such manner that the latter is slowly accelerated.

33. The method of accelerating, in conjunction with a source of electromotive forces, a dynamo-electric machine comprising primary and secondary members each conductively supplied with power from commutator machines electrically associated therewith, which comprises initially accelerating said commutator machines very rapidly in the same direction to a speed in excess of that at which commutation difficulties are pronounced, then increasing the algebraic speed difference between said commutator machines while maintaining the speeds thereof in excess of said limit-of-commutation-difficulties speed, and supplying power through said commutator machines to the members of the main machine in such manner that the latter is slowly accelerated.

34. The method of accelerating, in conjunction with a source of electromotive forces, a dynamo-electric machine comprising primary and secondary members each conductively supplied with power from commutator machines electrically associated therewith, which comprises initially accelerating said commutator machines very rapidly in the same direction to a speed in excess of that at which commutation difficulties are pronounced, then increasing the algebraic speed difference between said commutator machines while maintaining the speeds thereof in excess of said limit-of-commutation-difficulties speed, and then reversing the direction of rotation of one of said commutator machines and increasing its speed until the algebraic difference of the commutator machine speeds is equal to the difference prior to said reversal, said main dynamo-electric machine maintaining a constant speed during the last-described speed adjustment of the commutator machines.

35. The method of accelerating, in conjunction with a source of electromotive forces, a dynamo-electric machine comprising primary and secondary members each conductively supplied with power from commutator machines, which comprises initially accelerating said commutator machines very rapidly in the same direction to a speed in excess of that at which commutation difficulties are pronounced, then increasing the algebraic speed difference between said commutator machines, while maintaining the speeds thereof in excess of said limit-of-commutation-difficulties speed, and then decreasing both of said commutator-machine speeds until the algebraic difference of the commutator machine speeds is equal to the difference prior to said decrease, said main dynamo-electric machine maintaining a constant speed during the last-described speed adjustment of the commutator machines.

36. The method of accelerating, in conjunction with a source of electromotive forces, a dynamo-electric machine comprising primary and secondary members each conductively supplied with power from commutator machines, which comprises initially accelerating said commutator machines very rapidly in the same direction to a speed in excess of that at which commutation difficulties are pronounced, then increasing algebraic speed difference between said commutation machines while maintaining the speeds thereof in excess of said limit-of-commutation-difficulties speed, and then decreasing both of said commutator machine speeds, one of the machines passing through zero speed and increasing in the opposite direction until the algebraic difference of the commutator machine speeds is equal to the difference prior to said speed decrease, said main dynamo-electric machine maintaining a constant speed during the last-described speed adjustment of the commutator machines.

37. The method of accelerating, in conjunction with a source of electromotive forces, a dynamo-electric machine comprising primary and secondary members each conductively supplied with power from commutator machines, which comprises initially accelerating said commutator machines very rapidly in the same direction to a speed in excess of that at which commutation difficulties are pronounced, then increasing the algebraic speed difference between said commutator machines while maintaining the speeds thereof in excess of said limit-of-commutation-difficulties speed, then decreasing both of said commutator-machine speeds, one of the machines passing through zero speed and increasing in the opposite direction until the algebraic difference of the commutator-machine speed is equal to the difference prior to said speed decrease, said main dynamo-electric machine maintaining a constant speed during the last-described speed adjustment of the commutator machines, and then increasing the speed of the commutator machines in opposite directions until any desired speed of the main machine is attained.

In testimony whereof, I have hereunto subscribed my name this 30th day of July, 1919.

JOSEPH SLEPIAN.